United States Patent [19]

Turcheck, Jr. et al.

[11] Patent Number: 5,938,001

[45] Date of Patent: Aug. 17, 1999

[54] VIBRATORY CONVEYOR APPARATUS WITH PHASE-OPTIMIZED CONVEYOR DRIVE

[75] Inventors: Stanley P. Turcheck, Jr., Homer City; Richard J. Wahler, Indiana, both of Pa.

[73] Assignee: FMC Corporation, Chicago, Ill.

[21] Appl. No.: 08/784,427

[22] Filed: Jan. 16, 1997

[51] Int. Cl.⁶ .................................................. B65G 27/20
[52] U.S. Cl. ............................................................ 198/770
[58] Field of Search ............................................. 198/770

[56] References Cited

U.S. PATENT DOCUMENTS

| | | | |
|---|---|---|---|
| 3,053,379 | 9/1962 | Roder et al. | 198/770 |
| 3,226,989 | 1/1966 | Robins | 198/770 |
| 3,796,299 | 3/1974 | Musschoot | 198/770 |
| 3,882,996 | 5/1975 | Musschoot | 198/770 |
| 4,793,196 | 12/1988 | Davis et al. | 74/61 |
| 5,131,525 | 7/1992 | Musschoot | 198/770 |
| 5,351,807 | 10/1994 | Svejkovsky | 198/750 |
| 5,392,898 | 2/1995 | Burgess et al. | 198/750 |
| 5,460,259 | 10/1995 | Burgess | 198/764 |
| 5,584,375 | 12/1996 | Burgess et al. | 198/751 |
| 5,762,176 | 6/1998 | Patterson et al. | 198/770 |

FOREIGN PATENT DOCUMENTS

| | | | |
|---|---|---|---|
| 140409 | 11/1980 | Japan | 198/770 |
| 79/00453 | 7/1979 | WIPO | 198/770 |

OTHER PUBLICATIONS

Triple/S Dynamics, Inc., *Slipstick Horizontal Motion Conveyor Application Design Guide*. Not Dated, 4 pages, Dallas, TX.

Triple/S Dynamics, Inc., *Slipstick vs. Natural Frequency Conveyors*. 1991, 4 pages, Dallas, TX.

Triple/S Dynamics, Inc., *Slipstick Conveyors*. 1991, 11 pages, Dallas, TX.

Food Engineering Corporation, *X–Force Conveyor, The Ideal System For Handling Fragile and Delicate Products*. Not Dated, 4 pages, Minneapolis, MN.

Primary Examiner—David A. Bucci
Assistant Examiner—Douglas Hess
Attorney, Agent, or Firm—Rockey, Milnamow & Katz, Ltd.

[57] ABSTRACT

A vibratory conveyor apparatus includes a vibratory drive having first and second pairs of counter-rotating drive shafts, with first and second eccentric weight sets respectively mounted on the drive shafts. In distinction from previous constructions, the eccentric weights of the vibratory drive are mounted to induce maximum vibratory forces out-of-phase with each other, thereby effecting improved efficiency for material conveyance. The vibratory motion provided by the present conveying system has been found to be particularly suitable for handling of delicate or fragile materials.

9 Claims, 8 Drawing Sheets

VIBRATORY CONVEYOR APPARATUS WITH PHASE-OPTIMIZED CONVEYOR DRIVE

TECHNICAL FIELD

The present invention relates generally to a vibratory conveyor apparatus, and more particularly to a conveyor apparatus having an improved differential motion vibratory drive with eccentric weights of the drive mounted in a phase-optimized configuration for increasing the velocity of material conveyed by the apparatus.

BACKGROUND OF THE INVENTION

Vibratory conveyors are widely used for material handling, and typically include a generally elongated conveyor bed, and an associated vibratory drive. Operation of the vibratory drive induces vibratory motion in the conveyor bed, which motion in turn induces movement of articles along the bed. Vibratory drives for such devices typically include one or more pairs of counter-rotating shafts having eccentrically-mounted weights thereon for inducing the desired vibration of the conveyor bed.

One type of vibratory conveyor arrangement, sometimes referred to as a four shaft differential motion conveyor, includes a vibratory drive including first and second pairs of counter-rotating drive shafts, with one pair of drive shafts operated at twice the speed of the second pair. This type of vibratory drive arrangement has been found to induce substantially planar, slow forward and fast rearward motion, which is well suited for gentle handling of delicate materials, such as potato chips, flaked cereals, and the like. In this arrangement, the vibratory drive is configured such that the half-speed and full-speed drive shafts are synchronized, or operated in phase, such that the vibratory forces induced by the eccentrically mounted weights cyclically add in one direction, and cyclically subtract in the other direction. The drive is configured such that the addition of vibratory forces acts in the direction opposite to the material flow, causing a fast pull-back of the conveyor bed. In contrast, the vibratory forces subtract from one another in the direction of material flow, thereby causing the vibratory bed to slowly move forward in the direction of material feed.

The present invention contemplates an arrangement whereby eccentric weights of a differential motion vibratory drive are configured to provide out-of-phase inducement of vibratory motions, thereby substantially increasing the feed rate of material being conveyed, without any change in the rotating and balance of the shafts of the drive.

SUMMARY OF THE INVENTION

A vibratory conveyor apparatus, and vibratory conveyor drive, embodying the principles of the present invention includes first and second pairs of counter-rotating drive shafts upon which first and second eccentric weight sets are respectively mounted. In distinction from previously known vibratory drives, the eccentric weights of the present vibratory drive are arranged such that vibratory forces induced by the first set of weights are out-of-phase with the vibratory motion induced by the second eccentric weight set. The net effect of this phase optimized configuration of the eccentric weights is a substantial increase in the feed rate of the conveyor (on the order of fifty percent) for the same rotating imbalance on the drive shafts when compared to a conventional vibratory drive. Thus, the same material flow rate can be achieved as in a non-optimized system, thereby permitting reduction in drive connection strength, bearing and shaft sizes, etc., thus permitting the present arrangement to be more economically manufactured than previous constructions.

In accordance with the illustrated embodiment, a vibratory conveyor apparatus embodying the principles of the present invention includes an elongated conveyor bed, and a vibratory conveyor drive attached to the conveyor bed for inducing vibratory motion in the bed. The induced vibratory motion of the conveyor bed thereby effects conveyance of articles in a conveying direction along the length of the bed.

The vibratory drive comprises a frame, and first and second parallel pairs of counter-rotating drive shafts rotatably mounted on the frame. A drive arrangement, illustrated as including an electric motor and a system of drive belts, effects conjoint rotation of the first and second counter-rotating drive shafts, with the drive arrangement preferably configured to effect differential motion of the first and second pairs of shafts by rotation of the first pair of shafts at twice the rotational speed as the second pair of counter-rotating shafts.

The present vibratory drive further includes first and second eccentric weight sets respectively mounted on the first and second pairs of counter-rotating shafts. The first weight set includes at least one eccentric weight mounted on each of the first pair of drive shafts for rotation therewith, with the second weight set similarly including at least one eccentric weight mounted on each of the second pair of drive shafts for rotation therewith.

As noted, the first eccentric weight set is eccentrically mounted to induce first reciprocable vibratory forces which are out-of-phase with second reciprocable vibratory forces induced by the second eccentric weight set. It is preferred that the first and second sets of eccentric weights are mounted on the first and second pairs of drive shafts to induce reciprocable vibratory forces along a line substantially parallel to the conveying direction of the conveyor apparatus.

The first vibratory forces induced along this line are out-of-phase with the second vibratory forces in that the maximum values of the first vibratory forces along the line are non-synchronous with the maximum values of the second vibratory forces along the line. In a presently preferred arrangement, the first and second eccentric weight sets are mounted such that the maximum values of the first vibratory forces are induced along the line at 45 degrees of rotation of the first drive shafts after maximum and minimum values of the second vibratory forces are induced along the line. By this arrangement, substantially greater feed rates are achieved for materials being handled by the conveyor apparatus.

Other features and advantages of the present invention will become readily apparent from the following detailed description, the accompanying drawings, and the appended claims.

DETAILED DESCRIPTION

Figure 1:
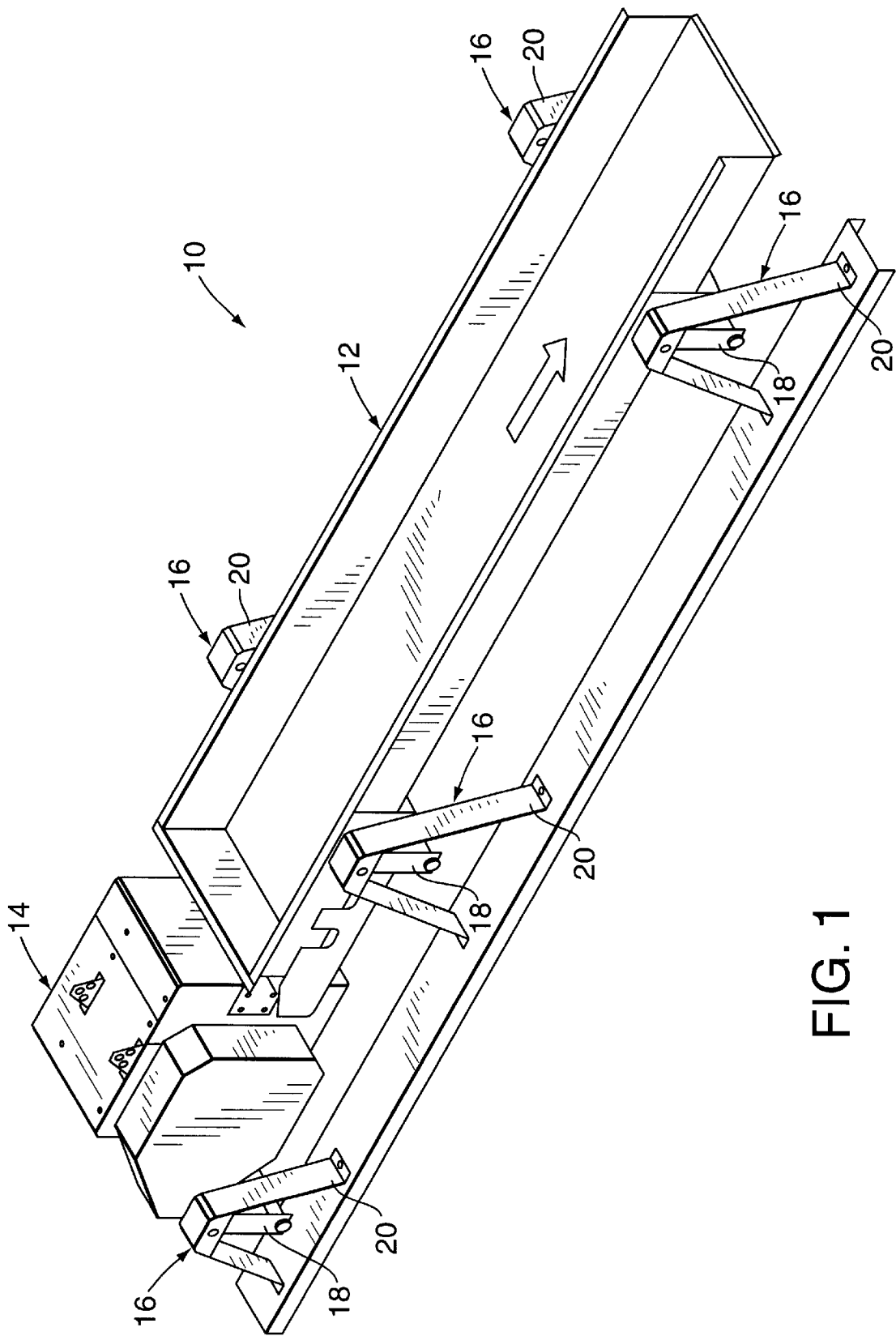
FIG. 1 is a perspective view of a vibratory conveyor apparatus embodying the principles of the present invention.

While the present invention is susceptible of embodiment in various forms, there is shown in the drawings and will hereinafter be described a presently preferred embodiment, with the understanding that the present disclosure is to be considered as an exemplification of the invention, and is not intended to limit the invention to the specific embodiment illustrated.

With reference first to FIG. 1, therein is illustrated a vibratory conveyor apparatus 10 embodying the principles of the present invention. The conveyor apparatus 10 includes a generally elongated conveyor bed 12 along which material to be conveyed is carried, generally in the direction indicated by the arrow C shown in FIG. 1. A vibratory drive 14, embodying the principles of the present invention, is attached to the conveyor bed 12 whereby operation of the vibratory drive induces vibratory motion in the conveyor bed along a line substantially parallel to the conveying direction of material moving along the conveyor bed.

The conveyor bed 12 and the vibratory drive 14 are mounted on a series of isolation supports 16 each including one or more isolation rocker legs 18 which suspend the conveyor bed and drive from isolation A-frames 20. The rocker legs 18 are typically connected with the A-frames, the conveyor bed 12, and the associated drive 14 with suitable bolts or other mechanical fasteners extending through rubber bushings press-fitted into opposite ends of the rocker legs 18. This arrangement allows the conveyor bed and drive to move smoothly forward and backward along a pendular arc. Thus, the isolation mounting arrangement effects mounting of the conveyor bed and vibratory drive for pendular arcuate movement.

Figure 2:
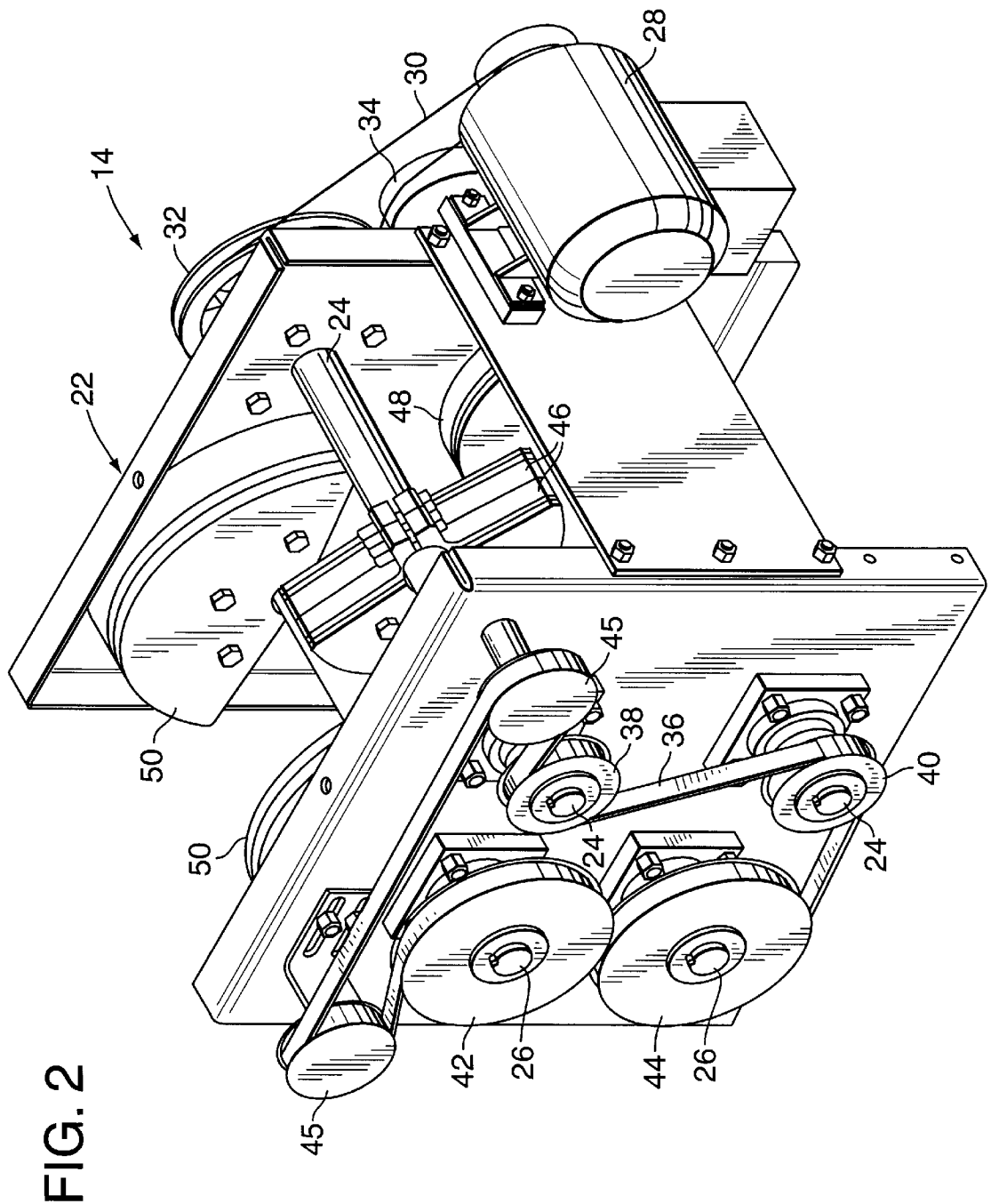
FIG. 2 is a perspective view of the vibratory drive of the conveyor apparatus shown in FIG. 1.
Figure 3:
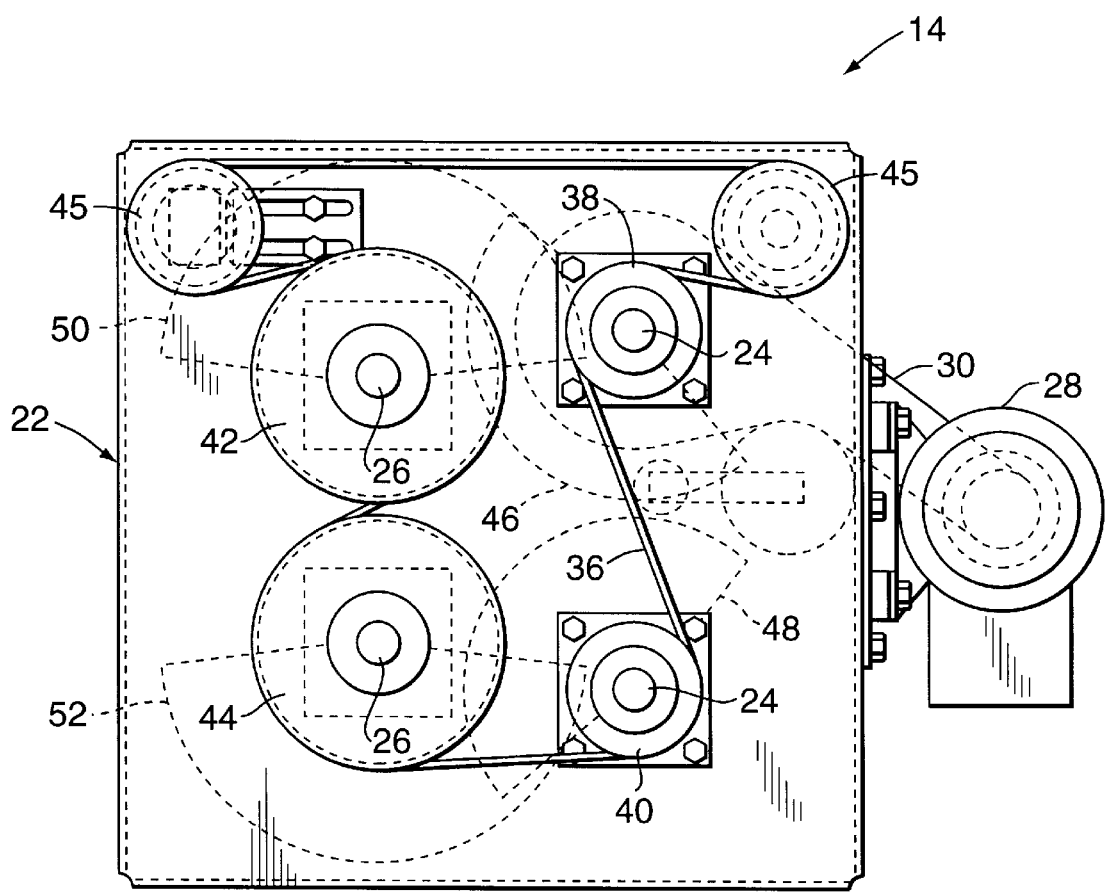
FIGS. 3 and 4 are respectively, top and side views of the vibratory drive shown in FIG. 2.
Figure 4:
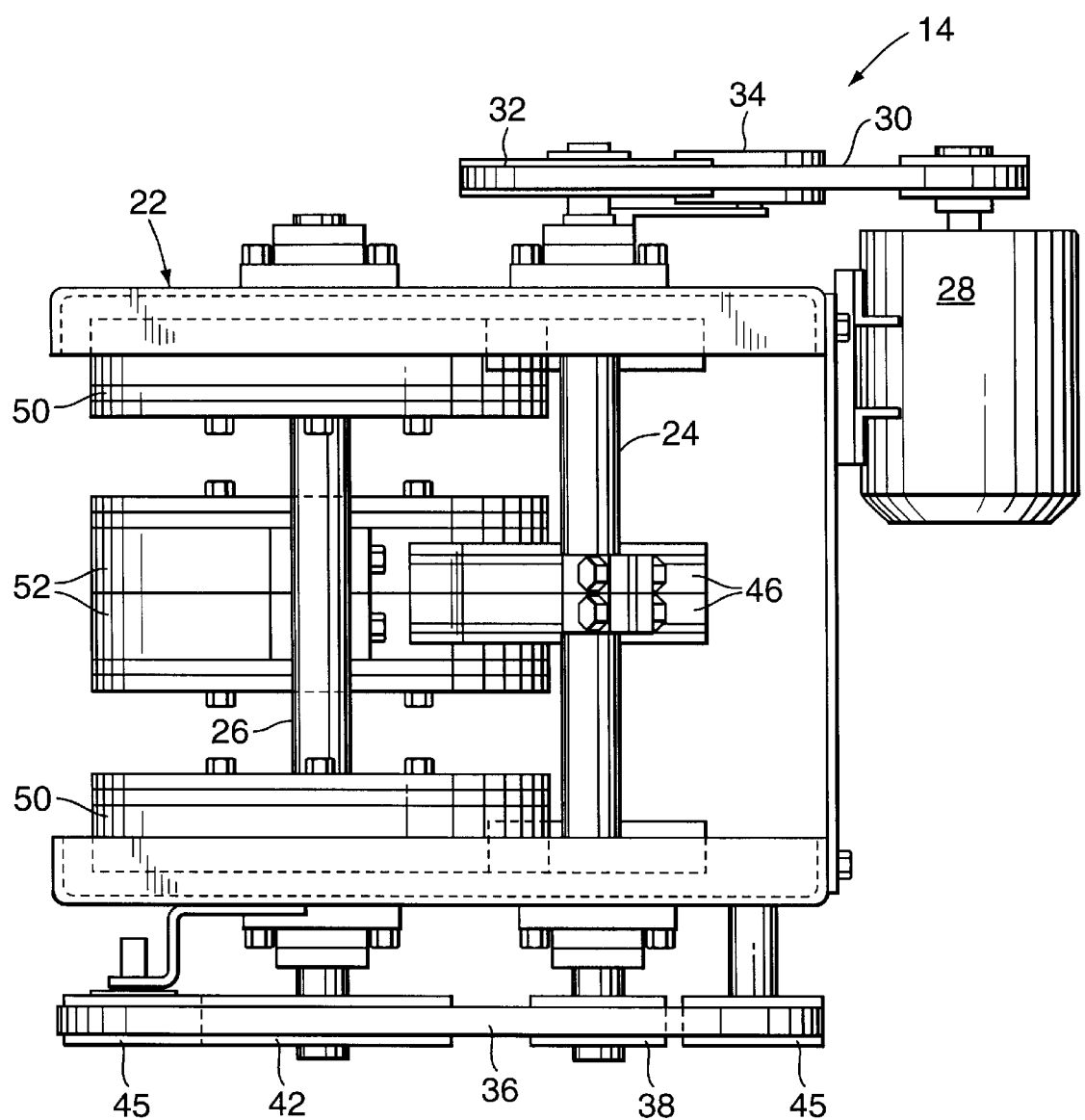
Figure 5B:
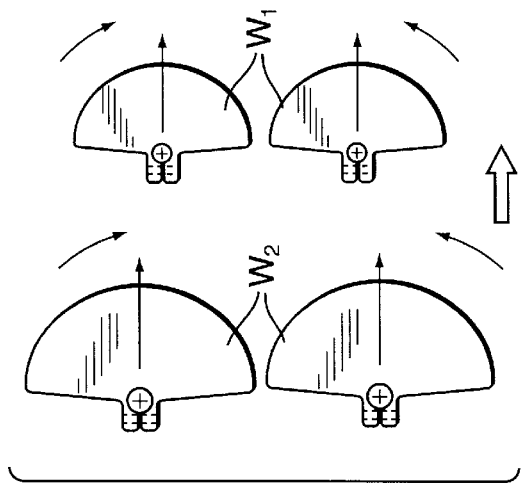
FIGS. 5A–D and 6A–D are diagrammatic views respectively illustrating the motion of eccentric weights of a previously known vibratory drive and of the vibratory drive of the present invention.
Figure 5D:
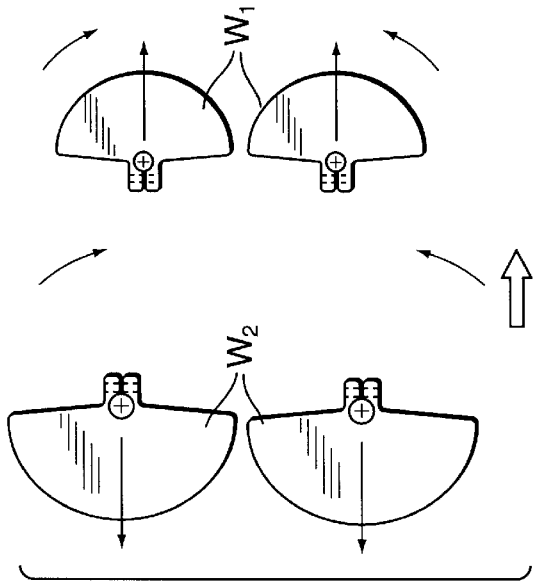
Figure 5A:
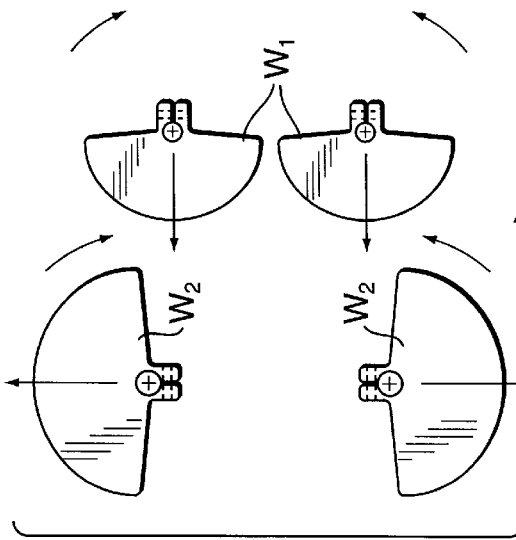
Figure 5C:
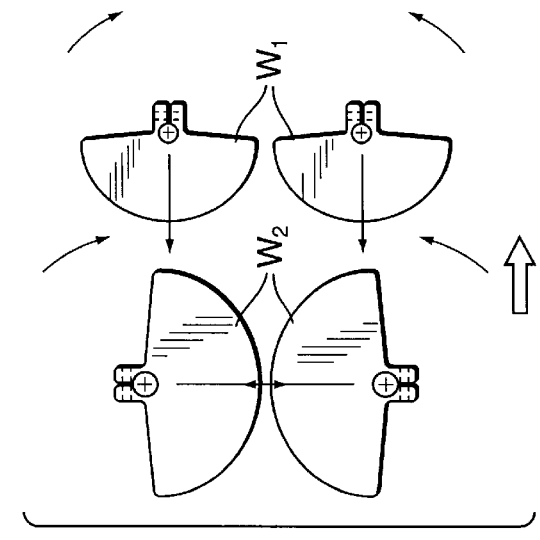
Figure 6B:
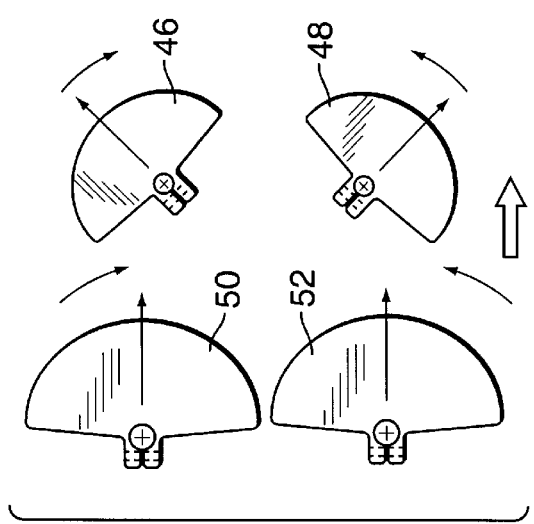
Figure 6D:
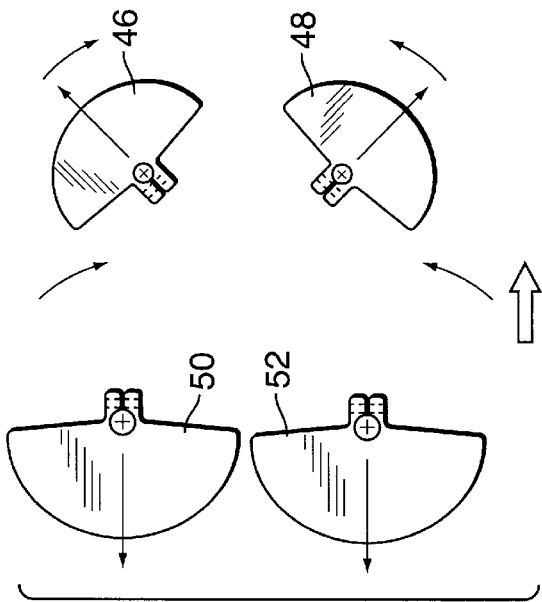
Figure 6A:
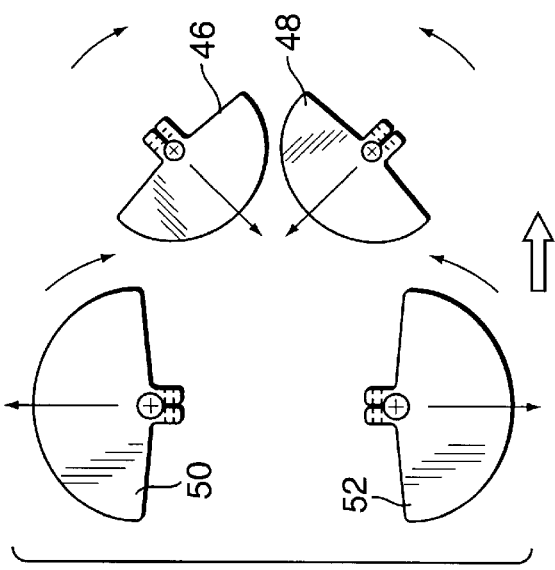
Figure 6C:
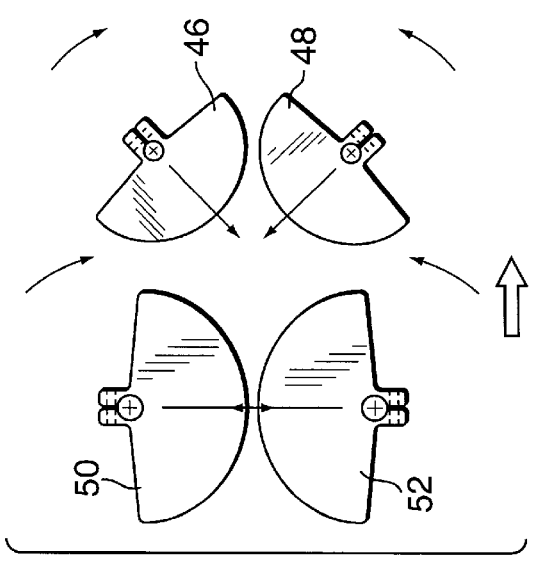

With particular reference to FIG. 2, therein is illustrated the vibratory drive 14 of the conveyor apparatus 10. The vibratory drive 14 is sometimes referred to as a four shaft differential motion drive, in that it includes first and second pairs of counter-rotating drive shafts, wherein the first pair of drive shafts are driven at twice the rotational speed of the second pair of drive shafts.

The vibratory drive 14 includes a frame 22 with a first pair of counter-rotating drive shafts 24, and a second pair of counter-rotating drive shafts 26 rotatably mounted in the frame 22. The first and second pairs of shafts are parallel to each other, with the first shafts 24 mounted in vertically aligned relationship, and the second shafts 26 also mounted in vertically aligned relationship, and in laterally spaced relationship to the first shafts 24. Suitable bearings provide the desired rotatable mounting of the drive shafts 24 and 26.

A drive motor 28, preferably comprising an electric motor, operates through the primary drive belt 30 to effect driven rotation of the upper one of drive shafts 24 via a drive input sheave 32. An idler 34, which may be configured as a Lovejoy idler, maintains the desired tension in the drive belt 30.

Conjoint rotation of the drive shafts 24, 26 for counter-rotation is effected via a drive belt 36. The drive belt 36 is trained about a drive pulley 38 mounted on the upper one of first drive shafts 24, with the drive belt 36 in turn effecting driven rotation of the lower one of first drive shafts 24 via a pulley 40, and the desired counter-rotation of second drive shafts 26 by respective pulleys 42, 44. Suitable idlers 45 maintain the desired tension in the drive belt 36. By virtue of the differing diameters of pulleys 38, 40, and pulleys 42, 44, first drive shafts 24 are rotatably driven at twice the rotational speed of second drive shafts 26.

In order to induce vibratory motions in the conveyor bed 12, the vibratory drive 14 includes first and second eccentric weight sets respectively mounted on the first and second pairs of counter-rotating drive shafts. The first weight set includes at least one eccentric weight mounted on each of first drive shafts 24, with the illustrated embodiment including two first eccentric weights 46 mounted on the upper one of drive shafts 24, generally at the center thereof, and two first eccentric weights 48 mounted on the lower one of drive shafts 24, generally at respective opposite ends thereof. Similarly, the second eccentric weight set includes at least one weight mounted on each of the second drive shafts 26. In the illustrated embodiment, a pair of second eccentric weights 50 are mounted on the upper one of second drive shafts 26, generally at respective opposite ends thereof, with a pair of second eccentric weights 52 mounted on the lower one of second drive shafts 26, generally at the center thereof. While the specific weight of each of the first and second weights can be varied while keeping with the principles disclosed herein, in a presently preferred embodiment, the first weight set collectively weighs less than the second weight set. In the illustrated embodiment, each of the four second weights 50, 52 weighs approximately three times each of the four first weights 46, 48.

With reference now to FIGS. 5A–D and 6A–D, the optimized arrangement of the eccentric weights 46, 48, and 50, 52 is diagrammatically illustrated, in comparison to a typical four shaft differential motion vibratory drive (with arrows illustrating the direction of material conveyance on the associated conveyor bed 12). As illustrated in FIG. 5A–D, a conventional drive is configured such that the eccentric weights, designated $W_1$ and $W_2$, of the first and second pairs of counter-rotating shafts (wherein the first shafts rotate at twice the speed of the second shafts) provide a generally additive effect, that is, the maximum values of the vibratory motions induced by the weights are in phase and synchronized with each other. Thus, when the maximum vibrational forces induced by second weights $W_2$ extend along a line perpendicular to a plane extending through the drive shafts, the vibratory forces induced by the first eccentric weights $W_1$ are also induced along the line. By virtue of the differential speeds at which the respective drive shafts are rotated, the maximum vibrational forces are added in one direction, and subtracted in an opposite direction.

Reference now to FIG. 6A–D shows the configuration of the eccentric weights of the present vibratory drive, which are mounted in an out-of-phase arrangement so that the maximum values of the vibratory forces of the first eccentric weight set are induced along a line (extending perpendicular to a plane through the first drive shafts) out-of-phase with the maximum values of the vibratory forces created along the line by the second weight set. Thus, as the first and second drive shafts are rotatably driven, maximum values of first vibratory forces are cyclically induced in opposite directions along the aforementioned line attendant to rotation of each of the first shafts, and maximum values of second reciprocable vibratory forces are induced in opposite directions along the line attendant to each rotation of the counter-rotating second drive shafts. The maximum values of the first vibratory forces are induced along the line out-of-phase with the maximum values of the second vibratory forces, with a presently preferred arrangement configured such that the first and second weight sets are mounted so that the maximum values of the first vibratory forces are induced along the line at 45 degrees of rotation of the first drive shafts after maximum and minimum values of the second vibratory forces are induced along the line.

Figure 7:
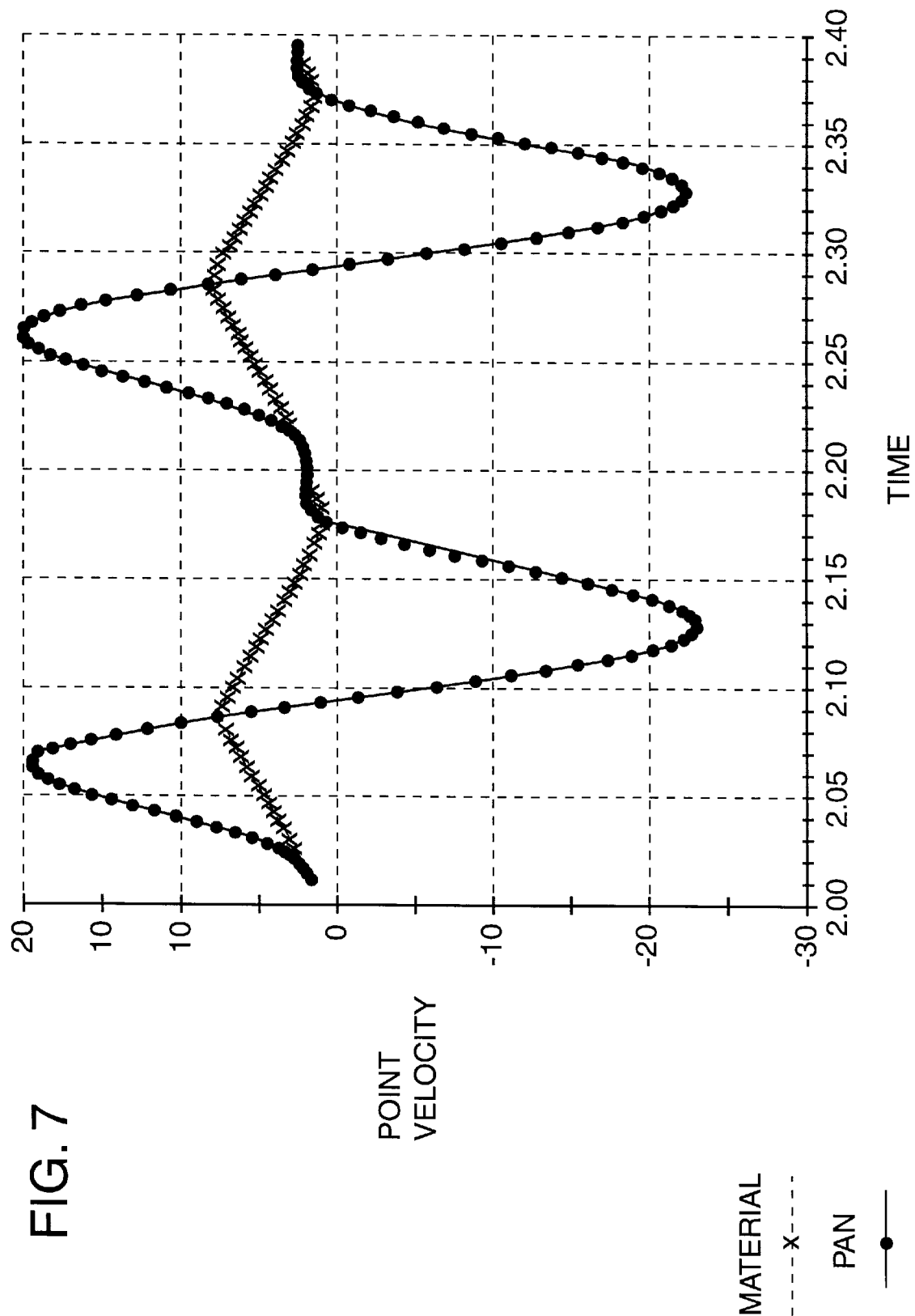
FIGS. 7 and 8 are graphical representations illustrating the theoretical velocities of conveyor beds, and material conveyed thereon, of a previously known vibratory drive, and a vibratory drive embodying the present invention.
Figure 8:
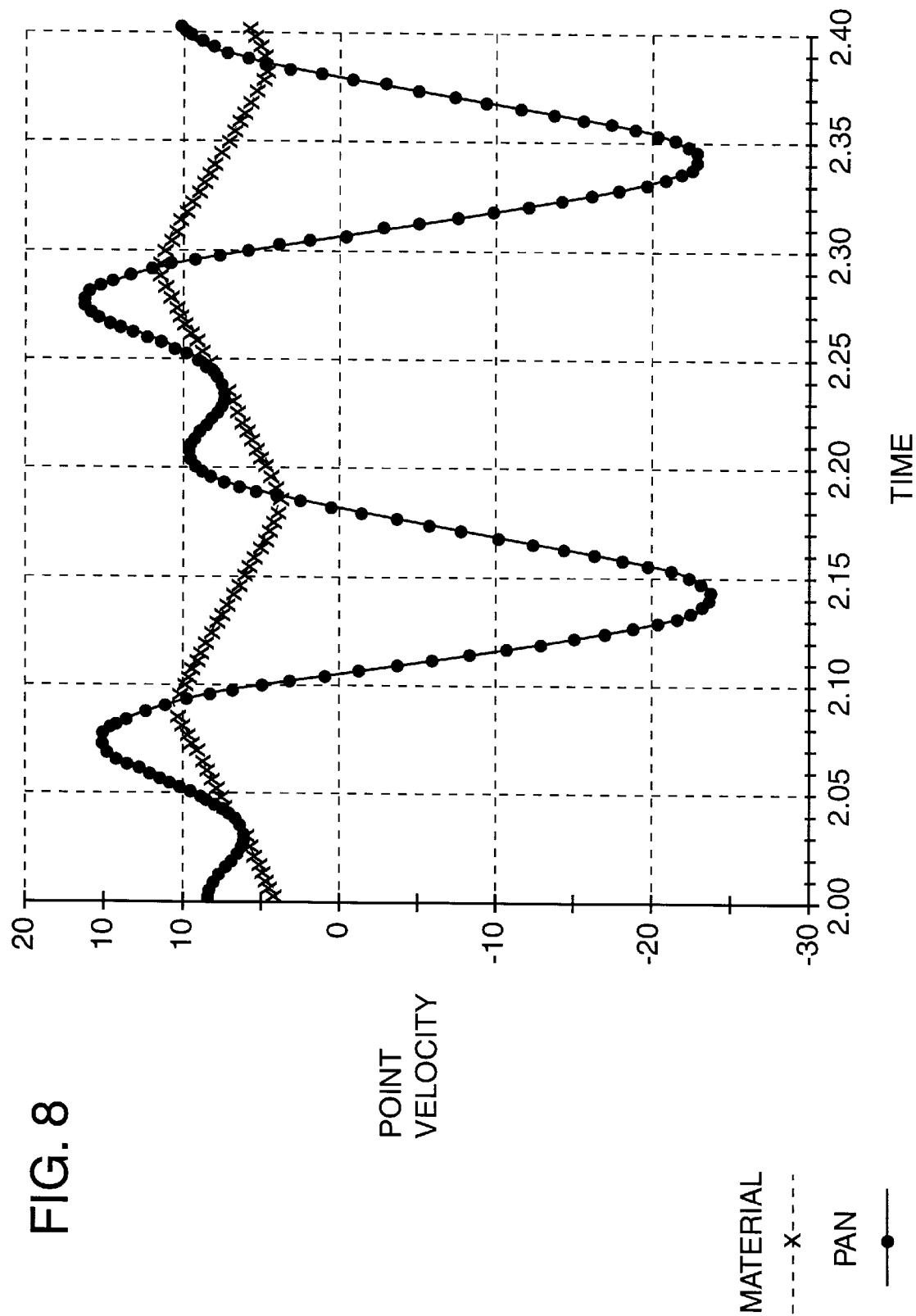

FIGS. 7 and 8 graphically illustrate and compare the theoretical motion of the vibratory conveyor bed 12, and material carried thereon. FIG. 7 illustrates the motion of the bed, and conveyed material, as provided by a conventional four shaft differential motion vibratory drive, as diagrammatically shown in FIG. 5A–D. In contrast, FIG. 8 illustrates graphically the motion of the conveyor bed 12, and material conveyed thereon, as driven by the vibratory drive 14 embodying the principles of the present invention. As will be observed, substantially increased material feed rates are achieved by the vibratory drive configured in accordance with the present invention.

The above-described configuration of the first and second weight sets of the vibratory drive 14 are configured such that the first weight set, including weights 46, 48, induce first reciprocable vibratory forces along the line perpendicular to a plane extending through the first drive shafts 24, 24, with maximum values of the first vibratory forces being cyclically induced in opposite directions along the line attendant to each rotation of the counter-rotating first drive shafts. Similarly, the weights 50, 52 of the second weight set are mounted on the second pair of drive shafts 26, 26 to induce second reciprocable vibratory forces along the aforesaid line, with maximum values of the second vibratory forces being cyclically induced in opposite directions along the line attendant to each rotation of the counter-rotating second drive shafts 26, 26. Maximum values of the first vibratory forces are induced along the line out-of-phase with maximum values of the second vibratory forces to optimize the material handling characteristics of the associated conveyor bed 12. In the illustrated embodiment, the first and second eccentric weight sets are mounted so that maximum values of the first vibratory forces are induced along the aforesaid line at 45 degrees of rotation of the first drive shafts 24 after maximum and minimum values of the second vibratory forces are induced along the line. However, it will be appreciated that the eccentric weight sets can be positioned in an out-of-phase relationship other than at this specific angular orientation.

From the foregoing, it will be observed that numerous modifications and variations can be effected without departing from the true spirit and scope of the novel concept of the present invention. It is to be understood that no limitation with respect to the specific embodiment illustrated herein is intended or should be inferred. The disclosure is intended to cover, by the appended claims, all such modifications as fall within the scope of the claims.

What is claimed is:

1. A vibratory conveyor apparatus comprising:
  an elongated conveyor bed; and
  a vibratory conveyor drive attached to said conveyor bed for inducing vibratory motion in said conveyor bed for thereby effecting conveyance of articles in a conveying direction along said bed,
  said vibrating drive comprising a frame, first and second pairs of counter-rotating drive shafts rotatably mounted on said frame, and means for rotatably driving said drive shafts,
  said vibrating drive further including first and second eccentric weight sets, said first weight set including at least one eccentric weight mounted on each of said first pair of drive shafts for rotation therewith, and said second weight set including at least one eccentric weight mounted on each of said second pairs of drive shafts for rotation therewith,
  said first eccentric weight set being eccentrically mounted to induce first reciprocable vibratory forces in opposite directions along a first line and having a first maximum value, and said second eccentric weight set being eccentrically mounted to induce second reciprocable vibratory forces in opposite directions along a second line and having a second maximum value, said first and second maximum values being out-of-phase by an acute angle of rotation of one member of said first pair of counter-rotating drive shafts.

2. A vibratory conveyor apparatus in accordance with claim 1, wherein
  said means for rotatably driving said drive shafts drives said first pair of drive shafts at twice the rotational speed of said second pair of drive shafts.

3. A vibratory conveyor apparatus according to claim 1, wherein said first and second lines are substantially parallel to said conveying direction.

4. A vibratory conveyor apparatus in accordance with claim 1, wherein
  said first pair of drive shafts are mounted in parallel, vertically aligned relationship on said frame, and said second pair of drive shafts are mounted in parallel, vertically aligned relationship on said frame, and in laterally spaced relationship to said first drive shafts.

5. A vibratory conveyor apparatus in accordance with claim 1, including
  means for mounting said conveyor bed and vibratory drive for pendular arcuate movement.

6. A vibratory conveyor drive, comprising:
  a frame;
  first and second parallel pairs of vertically aligned, counter-rotating drive shafts rotatably mounted on said frame;
  means for rotatably driving said drive shafts so that said first pair of drive shafts are driven at twice the rotational speed of said second pair of drive shafts; and
  first and second eccentric weight sets,
  said first weight set including at least one eccentric weight mounted on each of said first pair of drive shafts for rotation therewith to induce first reciprocable vibratory forces along a line perpendicular to a plane extending through said first drive shafts, maximum values of first vibratory forces being cyclically induced on opposite directions along said line attendant to each rotation of said counter-rotating first drive shafts,
  said second weight set including at least one eccentric weight mounted on each of said second pair of drive shafts for rotation therewith to induce second reciprocable vibratory forces along said line, maximum values of said second vibratory forces being cyclically induced in opposite directions along said line attendant to each rotation of said counter-rotating second drive shafts,
  wherein said maximum values of said first vibratory forces are induced along said line out-of-phase by an acute angle of rotation of said first drive shafts with said maximum values of second vibratory forces along said line.

7. A vibratory conveyor drive in accordance with claim 6, wherein
    said first and second eccentric weight sets are mounted so that maximum values of said first vibratory forces are induced along said line at 45 degrees of rotation of said first drive shafts after maximum values of said second vibratory forces are induced along said line.

8. A vibratory conveyor driver in accordance with claim 6, wherein
    said drive means comprises an electric motor and drive belt means operatively connecting said motor with said first and second drive shafts.

9. A vibratory conveyor drive in accordance with claim 6, wherein
    said first weight set weighs less than said second weight set.

* * * * *